(12) United States Patent
Hironaka

(10) Patent No.: US 6,286,096 B1
(45) Date of Patent: Sep. 4, 2001

(54) SYSTEM FOR PREVENTING A CPU FROM AN INPUT OF A POWER SOURCE UNTIL THE COMPLETION OF TRANSFERRING BIOS DATA FROM A HARD DISK TO A MAIN MEMORY

(75) Inventor: Masashi Hironaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/186,441

(22) Filed: Nov. 5, 1998

(30) Foreign Application Priority Data

Nov. 5, 1997 (JP) .................................................. 9-302919

(51) Int. Cl.[7] .................................................. G06F 9/449
(52) U.S. Cl. .............................. 713/2; 709/221; 711/102
(58) Field of Search .................................. 713/1, 2, 100; 709/220, 221, 222; 711/102, 103

(56) References Cited

U.S. PATENT DOCUMENTS

| 4,896,289 | * | 1/1990 | Svinicki et al. | 364/900 |
| 5,022,077 | * | 6/1991 | Bealkowski et al. | 380/4 |
| 5,420,998 | * | 5/1995 | Horning | 711/210 |
| 5,475,848 | * | 12/1995 | Ikeda | 713/300 |
| 5,600,801 | * | 2/1997 | Parks et al. | 710/102 |
| 5,610,981 | * | 3/1997 | Mooney et al. | 380/25 |
| 5,687,392 | * | 11/1997 | Rakdo | 710/22 |
| 5,787,308 | * | 7/1998 | Suzuki et al. | 710/19 |
| 5,829,012 | * | 10/1998 | Marlan et al. | 711/102 |
| 5,842,012 | * | 11/1998 | Walker et al. | 713/2 |
| 5,892,943 | * | 4/1999 | Rockford et al. | 713/2 |
| 5,978,922 | * | 11/1999 | Arai et al. | 713/323 |
| 6,026,465 | * | 2/2000 | Mills et al. | 711/103 |

FOREIGN PATENT DOCUMENTS

| 1-154226 | 6/1989 | (JP) . |
| 1-292531 | 11/1989 | (JP) . |
| 3-256127 | 11/1991 | (JP) . |
| 4-88432 | 3/1992 | (JP) . |

* cited by examiner

Primary Examiner—Thomas Lee
Assistant Examiner—Rijue Mai
(74) Attorney, Agent, or Firm—Foley & Lardner

(57) ABSTRACT

In a BIOS storing and controlling system, a hard disk storing BIOS data in a predetermined area. A system controller produces and supplies, at a time of input of a power source, an initial signal to the central processing unit. The central processing unit is held at an initial state from reception of the initial signal until reception of an initial state release signal. A hard disk controller and a memory controller transfers the BIOS data of the hard disk to a main memory device in a time interval of the initial state of the central processing unit. The hard disk controller produces and supplies the initial state release signal through the system controller to the central processing unit after transfer of the BIOS data. The central processing unit starts to access the main memory device when the central processing unit is supplied with the initial state release signal from the hard disk controller.

3 Claims, 3 Drawing Sheets

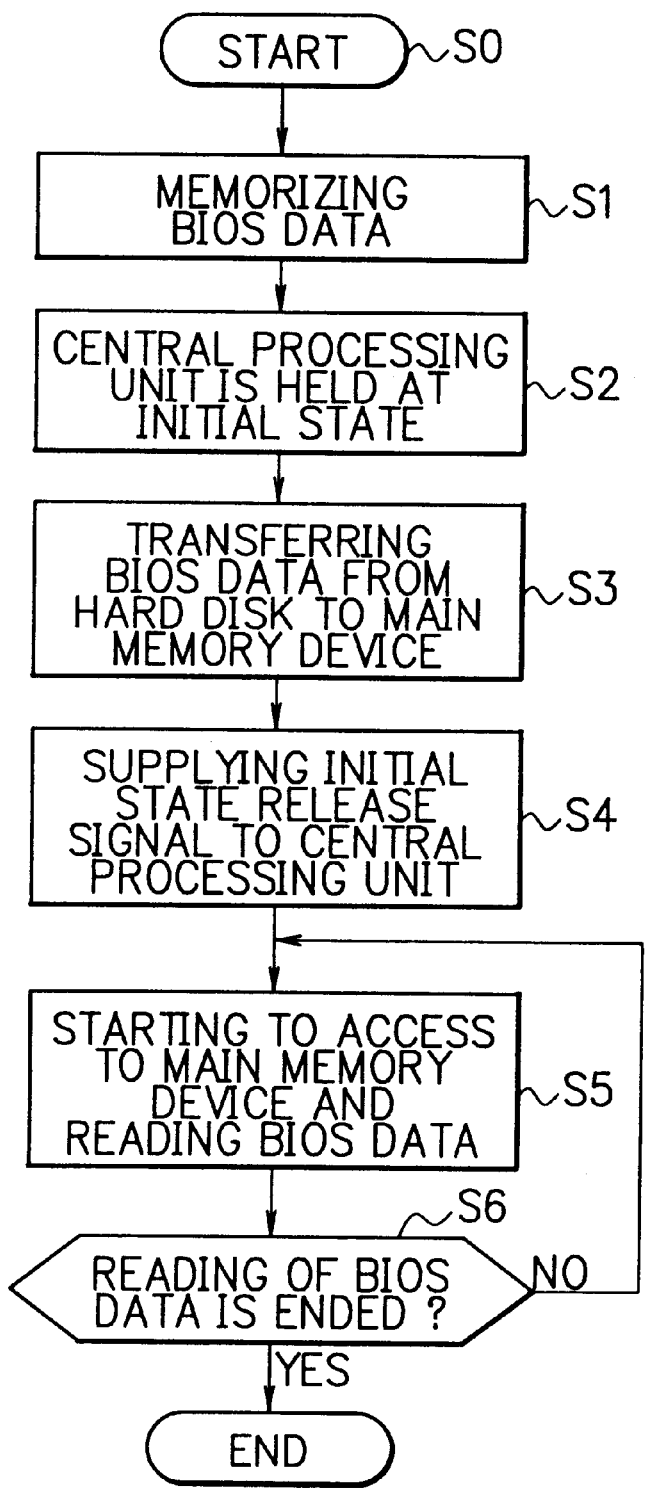

SYSTEM FOR PREVENTING A CPU FROM AN INPUT OF A POWER SOURCE UNTIL THE COMPLETION OF TRANSFERRING BIOS DATA FROM A HARD DISK TO A MAIN MEMORY

BACKGROUND OF THE INVENTION

This invention relates to a BIOS (basic input output system) memorizing and controlling system which memorizes and controls BIOS data.

DESCRIPTION OF THE PRIOR ART

In the manner which will be described, a conventional BIOS memorizing and controlling system comprises a central processing unit, a memory controller, a main memory device, a system controller, a flash ROM, a hard disk controller, and a hard disk. The flash ROM memorizes BIOS data.

The central processing unit starts, at a time of input of a power source, to read an initial command. In response to the operation of the central processing unit, the system controller transfers the BIOS data from the flash ROM to the central processing unit; The central processing unit continues reading the BIOS data from the flash ROM so that the central processing unit can executes a command.

However, the conventional BIOS memorizing and controlling system has a disadvantage that the conventional BIOS memorizing and controlling system has a great size because the conventional BIOS memorizing and controlling system needs the flash ROM which memorizes the BIOS data. Also, the conventional BIOS memorizing and controlling system has a disadvantage that it is difficult to accommodate an increase in the amount of the BIOS data because the capacity of the flash ROM which memorizes the BIOS data is small.

SUMMARY OF THE INVENTION

It is therefore an object of this invention to provide BIOS memorizing and controlling system and method which is capable of miniaturizing and accommodating an increase in the amount of BIOS data.

Other objects of this invention will become clear as the description proceeds.

According to a first aspect of this invention, there is provided a BIOS memorizing and controlling system which comprises a central processing unit, a main memory device, and a fixed memory device which are, each connected to other, the BIOS holding and controlling system comprising:

data memorizing means for memorizing BIOS data in a predetermined area of the fixed memory device;

initial state holding means of holding an initial state of the central processing unit from input of a power source until the initial state holding means is supplied with an initial state release signal;

data transferring means connected to the data memorizing means and to the main memory device for transferring the BIOS data of the data memorizing means to the main memory device in a time interval of the initial state of the central processing unit, the data transferring means producing and supplying the initial state release signal to the initial state holding means after transfer of the BIOS data; and access starting means connected to the central processing unit and to the data transferring means for making the central processing unit start to access to the main memory device when the access starting means is supplied with the initial state release signal from the data transferring means.

According to a second aspect of this invention, there is provided a BIOS memorizing and controlling system which comprises a central processing unit, a memory controller connected to the central processing unit, a main memory device connected to the memory controller, a system controller connected to the central processing unit and to memory controller, a hard disk controller connected to the central processing unit, to the memory controller, and to the system controller, and a hard disk connected to the hard disk controller, wherein:

the hard disk memorizing BIOS data in a predetermined area;

the system controller producing and supplying, at a time of input of a power source, an initial signal to the central processing unit;

the central processing unit being held at an initial state from reception of the initial signal until reception of an initial state release signal;

the hard disk controller and the memory controller transferring the BIOS data of the hard disk to the main memory device in a time interval of the initial state of the central processing unit, the hard disk controller producing and supplying the initial state release signal to the central processing unit through the system controller after transfer of the BIOS data; and the central processing unit stating to access to the main memory device when the central processing unit is supplied with the initial state release signal from the hard disk controller.

According to a third aspect of this invention, there is provided a BIOS memorizing and controlling method in a BIOS memorizing and controlling system which comprises a central processing unit, a main memory device, and a fixed memory device which are, each other, connected, the BIOS holding and controlling method comprising:

a step of memorizing, by data memorizing means, BIOS data in a predetermined area of the fixed memory device;

a step of holding, by initial state holding means, an initial state of the central processing unit from input of a power source until the initial state holding means is supplied with an initial state release signal;

a step of transferring the BIOS data to the main memory device in a time interval of the initial state of the central processing unit, and of producing and supplying the initial state release signal to the initial state holding means after transfer of the BIOS data; and a step of making, in response to the initial state release signal, the central processing unit start to access to the main memory de vice.

BRIEF DESCRIPTION OF THE DRAWINGS

FIG. 3 is a flow chart for use in describing an operation of the BIOS memorizing and controlling system illustrated in FIG. 2.

DESCRIPTION OF THE PREFERRED EMBODIMENT

Figure 1:
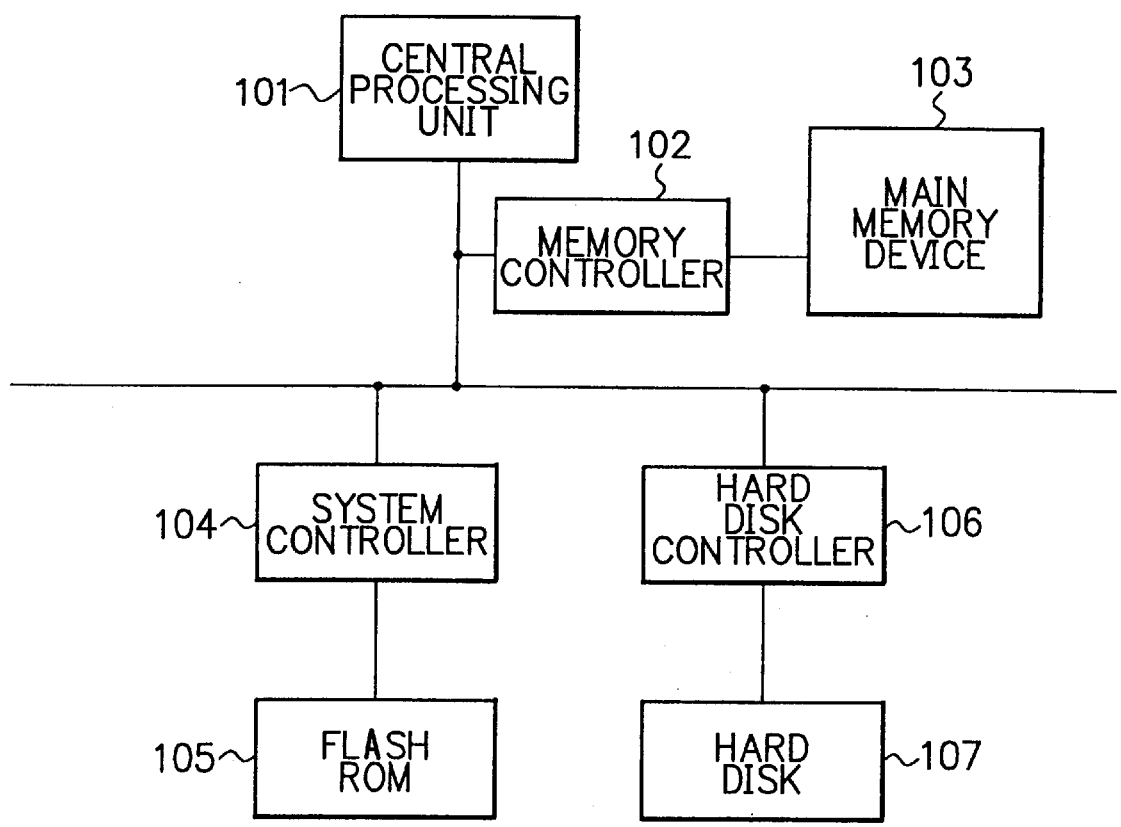
FIG. 1 is a block diagram of a conventional BIOS memorizing and controlling system.

Referring to FIG. 1, a conventional BIOS memorizing and controlling system will be described for a better understanding of this invention. The conventional BIOS memorizing and controlling system comprises a central processing unit 101, a memory controller 102, a main memory device 103, a system controller 104, a flash ROM 105, a hard disk controller 106, and a hard disk 107. The flash ROM 105 memorizes BIOS data.

The central processing unit 101 starts, at a time of input of a power source (not shown), to read an initial command. In response to the operation of the central processing unit 101, the system controller 104 transfers the BIOS data from the flash ROM 105 to the central processing unit 101. The central processing unit 101 continues to read the BIOS data from the flash ROM 105 so that the central processing unit 101 can execute a command. In this event, the memory controller 102, the main memory device 103, the hard disk controller 106, and the hard disk 10,7 do not operate.

However, the conventional BIOS memorizing and controlling system has a disadvantage in that the conventional BIOS memorizing and controlling system is large because the conventional BIOS memorizing and controlling system needs the flash ROM 105 which memorizes the BIOS data. Also, the conventional BIOS memorizing and controlling system has a disadvantage in that it is difficult to accommodate an increase of amount of the BIOS data because the capacity of the flash ROM 105 which memorizes the BIOS data is small.

Figure 2:
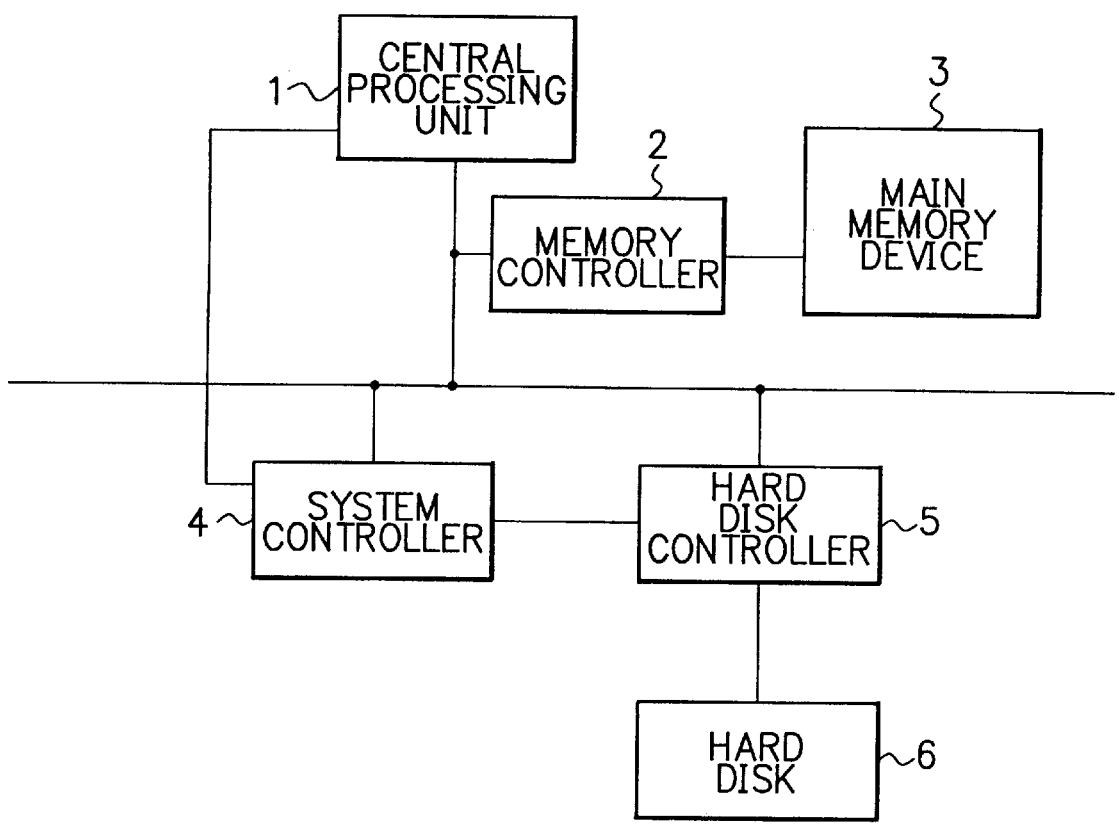
FIG. 2 is a block diagram of a BIOS memorizing and controlling system according to an embodiment of this invention.

Referring to FIGS. 2 and 3, a BIOS memorizing and controlling system according to an embodiment of this invention will be described in detail.

In FIG. 2, the BIOS memorizing and controlling system comprises a central processing unit 1, a memory controller 2, a main memory device 3, a system controller 4, a hard disk controller 5, and a hard disk 6. The memory controller 2 is connected to the central processing unit 1. The main memory device 3 is connected to the memory controller 2 The system controller 4 is connected to the central processing unit 1 and to memory controller 2. The hard disk controller 5 is connected to the central processing unit 1, to the memory controller 2, and to the system controller 4. The hard disk 6 is connected to the hard disk controller 5.

The hard disk 6 memorizes BIOS data in a predetermined area. The system controller 4 produces and supplies, at a time of input of a power source (not shown), an initial signal to the central processing unit 1. The central processing unit 1 is held at an initial state from reception of the initial signal until reception of an initial state release signal.

The hard disk controller 5 and the memory controller 2 transfers the BIOS data of the hard disk 6 to the main memory device 3 in a time interval of the initial state of the central processing unit 1. The hard disk controller 5 produces and supplies the initial state release signal to the system controller 4 after transfer of the BIOS data. The system controller 4 sends the initial state release signal to the central processing unit 1 when the system controller 4 is supplied with the initial state release signal from the hard disk controller 5. The central processing unit I starts to access to the main memory device 3 when the central processing unit I is supplied with the initial state release signal from the hard disk controller 5.

Referring to FIG. 3 together with FIG. 2, an operation of the BIOS memorizing and controlling system will be described in detail.

At a start step S0, the power source is inputted. At a step S1, the hard disk 6 stores, in the predetermined area, the BIOS data. The step S1 proceeds to a step S2 at which the central processing unit 1 is held at the initial state from reception of the initial signal until reception of the initial state release signal.

The step S2 proceeds to a step S3 at which the hard disk controller 5 and the memory controller 2 transfers the BIOS data of the hard disk 6 to the main memory device 3 in the time interval of the initial state of the central processing unit 1. The step S3 proceeds to a step S4 at which the hard disk controller 5 produces and supplies the initial state release signal to the central processing unit 1 after transfer of the BIOS data.

The step S4 proceeds to a step S5 at which the central processing unit 1 starts to access to the main memory device 3 so as to read the BIOS data from the main memory device 3 when the central processing unit 1 is supplied with the initial state release signal from the hard disk controller 5.

The step S5 proceeds to a step S6 at which the central processing unit 1 judges whether or not the central processing unit 1 ends to read the BIOS data from the main memory device 3. When the central processing unit 1 ends to read the BIOS data from the main memory device 3, the operation is ended. Otherwise, the step S6 returns to the step S5.

What is claimed is:

1. A BIOS storing and controlling system which comprises a central processing unit, a main memory device, and a fixed memory device which are connected to each other, said BIOS storing and controlling system comprising:

data storing means for storing BIOS data in a predetermined area of said fixed memory device, said BIOS data being other than a pre-boot program;

initial state holding means of holding an initial state of said central processing unit from an input of a power source until said initial state holding means is supplied with an initial state release signal;

data transferring means connected to said data storing means and to said main memory device for transferring said BIOS data of said data storing means to said main memory device in a time interval of said initial state of said central processing unit, said data transferring means producing and supplying said initial state release signal to said initial state holding means after transfer of said BIOS data; and access starting means connected to said central processing unit and to said data transferring means for making said central processing unit start to access said main memory device when said access starting means is supplied with said initial state release signal from said data transferring means.

2. A BIOS storing and controlling system which comprises a central processing unit, a memory controller connected to said central processing unit, a main memory device connected to said memory controller, a system controller connected to said central processing unit and to said memory controller, a hard disk controller connected to said central processing unit, to said memory controller, and to said system controller, and a hard disk connected to said hard disk controller, wherein:

said hard disk. stores BIOS data in a predetermined area, said BIOS data being other than a pre-boot program;

said system controller producing and supplying, at a time of input of a power source, an initial signal to said central processing unit;

said central processing unit being held at an initial state from reception of said initial signal until reception of an initial state release signal;

said hard disk controller and said memory controller transferring said BIOS data of said hard disk to said main memory device in a time interval of said initial state of said central processing unit, said hard disk controller producing and supplying said initial state release signal through said system controller to said central processing unit after transfer of said BIOS data; and said central processing unit starting to access said main memory device when said central processing unit is supplied with said initial state release signal from said hard disk controller.

3. A BIOS storing and controlling method in a BIOS memorizing and controlling system which comprises a central processing unit, a main memory device, and a fixed memory device which are connected to each other, said BIOS holding and controlling method comprising:

a step of storing BIOS data in a predetermined area of said fixed memory device, said BIOS data being other than a pre-boot program;

a step of holding an initial state of said central processing unit from input of a power source until receipt of an initial state release signal;

a step of transferring said BIOS data to said main memory device in a time interval of said initial state of said central processing unit, a step of producing and supplying said initial state to said central processing unit; and a step of making, in response to said initial state release signal, said central processing unit start to access said main memory device.

* * * * *